United States Patent [19]

Feiner et al.

[11] 4,190,747
[45] Feb. 26, 1980

[54] SIGNAL CORRECTED OPTOCOUPLED DEVICE

[75] Inventors: Alexander Feiner, Rumson; Chao Kai Liu, Matawan; Sigurd G. Waaben, Princeton, all of N.J.

[73] Assignee: Bell Telephone Laboratories, Incorporated, Murray Hill, N.J.

[21] Appl. No.: 893,795

[22] Filed: Apr. 5, 1978

[51] Int. Cl.² ........................ H04B 1/58; H04B 9/00
[52] U.S. Cl. .......................... 179/170 NC; 179/170 R; 250/199; 250/205; 307/311
[58] Field of Search ......... 179/16 F, 16 EA, 170 NC, 179/170 R; 250/199, 205, 551, 578; 307/311; 328/2; 330/59

[56] References Cited
U.S. PATENT DOCUMENTS

| | | | |
|---|---|---|---|
| 3,504,127 | 3/1970 | Slana | 179/16 F |
| 3,772,514 | 11/1973 | Sunderland | 250/551 |
| 3,952,205 | 4/1976 | Tobey, Jr. et al. | 250/551 |
| 3,991,279 | 11/1976 | Morgan | 179/1 CN |
| 4,032,843 | 6/1977 | Loucks | 250/551 |
| 4,045,615 | 8/1977 | James | 179/1 CN |
| 4,056,719 | 11/1977 | Waaben | 250/199 |
| 4,070,572 | 1/1978 | Summerhayes | 250/199 |

Primary Examiner—Kathleen H. Claffy
Assistant Examiner—Randall P. Myers
Attorney, Agent, or Firm—David H. Tannenbaum

[57] ABSTRACT

A remote gain controlled optocoupled device is disclosed utilizing a DC reference voltage in the output section to compensate for variations in the optocoupling characteristics of the circuit. The DC voltage level output of the photodetector, which is a function of the light transfer characteristics of the circuit, is compared to a remotely controlled reference DC level. The output AC signal level, which substantially tracks the DC voltage output, is gain adjusted under control of the compared DC voltage levels.

5 Claims, 6 Drawing Figures

FIG. 1

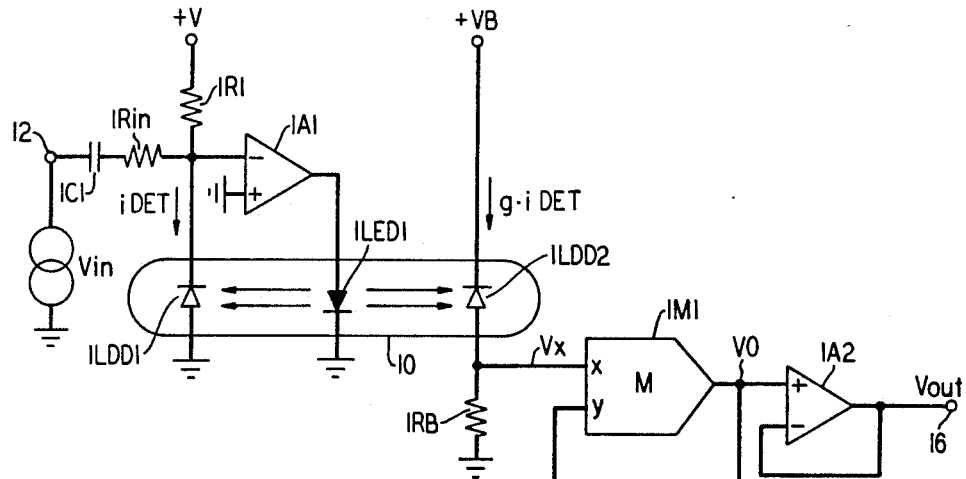

FIG. 2

$V_O(DC) = V_{REF}(DC)$
$V_O(DC) = V_x(DC) M V_y \qquad V_O = V_x \cdot V_y \cdot M$
$\therefore V_y = \dfrac{V_{REF}(DC)}{V_x(DC) M}$

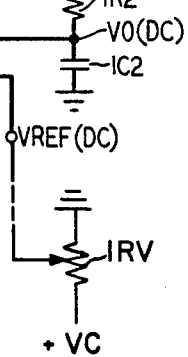

FIG. 3

$V_O(AC) = V_x(AC) M V_y$ $V_O(AC) = V_x(AC) M \cdot \dfrac{V_{REF}(DC)}{V_x(DC) M}$ $V_O(AC) = V_x(AC) \dfrac{V_{REF}(DC)}{V_x(DC)}$ $V_x(DC) = g \cdot (iDET)(DC) \cdot IRB = g \cdot \dfrac{V}{IRI} \cdot IRB$ $V_x(AC) = g \cdot (iDET)(AC) \cdot IRB = g \cdot \dfrac{Vin}{IRin} \cdot IRB$ $V_O(AC) = g \dfrac{Vin}{IRin} IRB \dfrac{V_{REF}(DC)}{g \cdot \dfrac{V}{IRI} \cdot IRB}$ $V_O(AC) = Vin \left( \dfrac{V_{REF}(DC) IRI}{(V) IRin} \right)$ $V_O(AC) = Vin \, K \, (V_{REF}(DC))$ $K = \dfrac{IRI}{(V)(IRin)}$

SIGNAL CORRECTED OPTOCOUPLED DEVICE

BACKGROUND OF THE INVENTION

1. Technical Field

This invention relates to electrical isolation devices and particularly to an improved optocoupler device having a controllable output gain.

2. Background Art

It has become known that it is possible to design an isolation device for passing signals from an input to an output using optocoupling at the barrier between the input and output terminals. Such a device is the subject of U.S. Pat. No. 4,056,719 issued to S. G. Waaben on Nov. 1, 1977. The Waaben patent provides a solution to the problems of linearity of the output signal with respect to the input signal. Under the Waaben teaching a pair of light detecting diodes and a light emitting diode are used in a feedback arrangement such that the light output characteristics of the photodetector in the output circuit linearly track the input signal. Thus, as taught by Waaben, an optocoupler can be built that corrects for light output differences between LED's and photodiodes as well as corrects for temperature coefficient differences between devices.

However, a further problem exists primarily because of the inherent differences among the light transfer functions of different LED-photodetector pairs. This difference requires the gain of each device to be adjusted. Thus, the circuit which controls the bias of both the light-emitting and light-collecting diodes must be tuned to each circuit in order to insure highest precision signal gain. This tuning would typically be accomplished by varying the resistance values of the bias circuit. While such resistance matching is possible using potentiometers, such devices add undue expense to a production circuit.

Another approach would be to test the LED's and photodetectors and to match fixed resistors with each LED-photodetector pair prior to manufacturing. However, this solution is again extremely costly and viable only in limited production facilities.

Thus, a need exists in the art for a gain corrected optocoupler device which can be mass produced from available components without preselecting those components and without the need for externally gain correcting after manufacture.

A further need exists in the art for a transformerless isolation device which has a known gain output.

It is a general object of this invention to satisfy these and other needs by an optocoupled gain corrected device.

DISCLOSURE OF THE INVENTION

By taking advantage of the fact that the AC and DC light curve for the photodiodes track each other over a substantial operational range, the DC output level of the photodiode (which is in the output side of the barrier) can be made to be a reliable indication of the output AC signal level. By recognizing that the DC voltage output of the photodetector is a measure of the light coming to it and by assuming a reference DC level, it is possible to compare that reference level with the actual DC output voltage level and to adjust the AC signal to compensate for variations in both the light transmitting and light detecting characteristics of the photo-coupled diode pair.

The device is designed in a manner such that the AC signal passing from the input to the output can be precisely gain controlled by controlling the DC voltage level. This is accomplished by establishing a reference DC voltage level which is then compared to the DC voltage level of the photodiode detector. The difference between these values is used in a multiplier circuit to adjust the magnitude of the AC signal output. Thus, based on the inventive concept, a DC reference voltage on the output side of an optocoupler device is utilized to control the AC signal gain of the coupler thereby automatically compensating for the parameters affecting the photo-coupling of the input and output circuits. Accordingly, not only does the circuit become manufacturable using standard components having wide tolerance values, but the output circuit becomes gain adjustable remotely simply by adjusting the DC reference voltage.

Accordingly, it is a feature of our invention to provide an isolation device capable of precise gain adjustment by exploiting the tracking characteristics of the AC and DC voltage properties of optocoupled circuits and by establishing a DC reference level for control purposes.

It is also a feature of our invention to provide a device for isolation purposes taking advantage of the capabilities of optocoupled circuitry, by precisely controlling the gain of the device under control of a DC reference voltage, where one side of the device is completely floating.

DESCRIPTION OF THE DRAWINGS

These features and objects of our invention will be more fully appreciated from a review of the drawings in which:

FIG. 1 shows a signal corrected optocoupled device using a multiplier circuit in the output to control the gain;

FIGS. 2 and 3 show the equations pertaining to FIG. 1;

DETAILED DESCRIPTION

Prior to discussing the operation of our invention, it may be helpful to understand the operation of prior art linear optocoupled devices. In this respect, FIG. 4, which is the subject of the aforementioned S. G. Waaben patent, may be helpful. The aforementioned Waaben patent is hereby incorporated by reference into this application.

Figure 4:
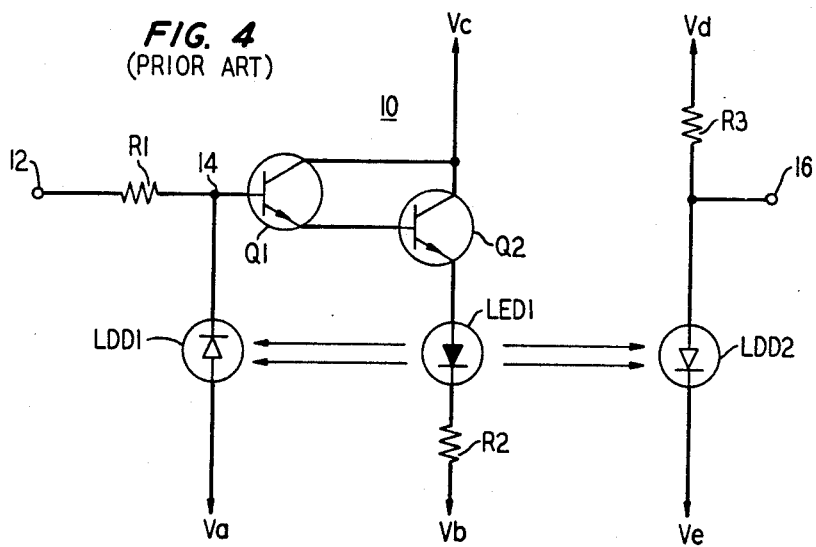
FIG. 4 is a representation of a prior art optocoupled device.

As taught by Waaben and as shown in FIG. 4, an AC signal entering the device at terminal 12 is supplied to transistors Q1 and Q2. This signal is then supplied to light emitting diode LED1, thereby producing a light signal which is sent in two directions and detected by light detecting diodes LDD1 and LDD2. The output of light detecting diode LDD2 is supplied to output terminal 16 of the device. Because of nonlinearities in the optocoupling, the output signal at terminal 16, if nothing more than just described happened, would not exactly track the input signal at terminal 12. In Waaben, however, the light which impinges on LDD2 also impinges upon light detecting diode LDD1 and operates in a feedback manner to the input of transistor Q1 to adjust the input signal to light emitting diode LED1. Since the light detecting diodes LDD1 and LDD2 are similar in structure and contained within the same light conducting package, nonlinearities are removed from the output signal. For a more detailed explanation of the operation of FIG. 4, the reader is invited to review the aforementioned Waaben patent.

While FIG. 4 provides an output signal at terminal 16 which is linearly related to the input signal at terminal 12, the amplitude or gain of the signal at terminal 16 is not well controlled. This results from the fact that the amount of light crossing the barrier between light emitting diode LED1 and light detecting diodes LDD2 and LDD1 vary for each light emitting and light detecting pair. As has been discussed, this nonuniformity in light transfer can be compensated for either by preselecting the photodiode pairs or by adjusting the DC bias via resistor R3. As discussed, such preselection of components or bias adjusting is inherently difficult to achieve and a relatively costly solution in high volume production devices.

Turning now to FIG. 1, there is shown a signal corrected optocoupled device with gain compensation built into the output circuit under control of a DC voltage reference. This circuit is designed to take advantage of the characteristic shown in FIG. 5, whereby the DC gain of light detecting diode 1LDD2 tracks almost identically of the AC gain of that light detecting diode over a substantial range of operating currents. Thus, by comparing the DC signal of light detecting diode 1LDD2 with a known DC reference signal it is possible to control the AC output gain of the circuit.

Figure 5:
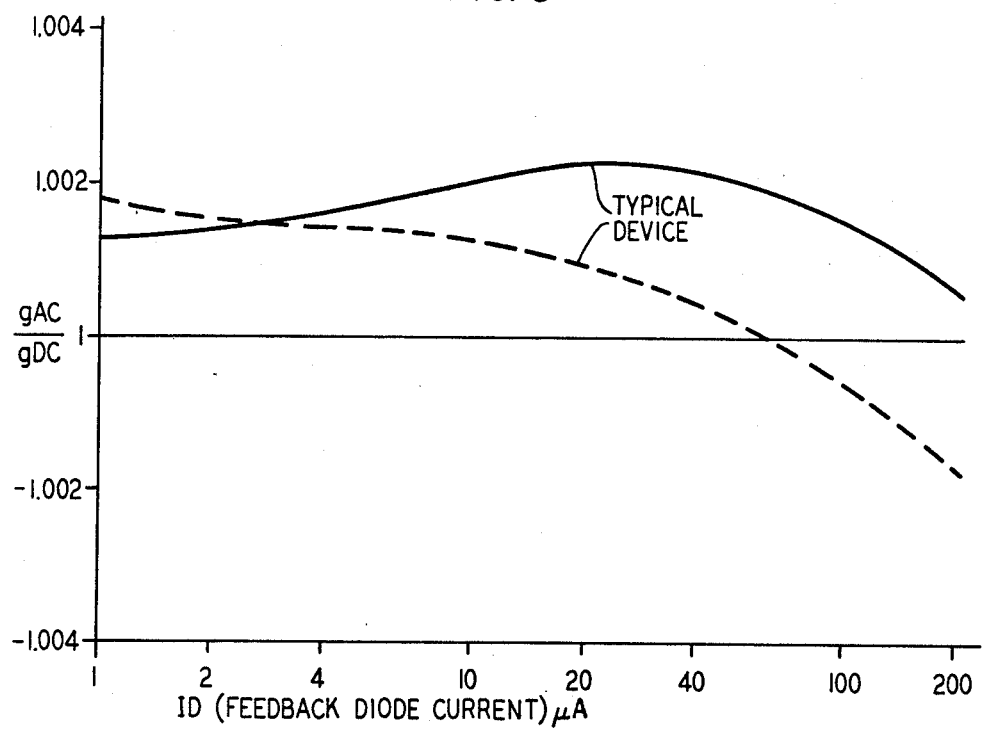
FIG. 5 is a graph showing the tracking characteristics of the AC and DC gain of optocoupled devices.

In FIG. 5 there is shown a graph of the feedback diode current in microamps as a function of the ratio of AC gain to DC gain of a typical light coupled device. It can clearly be seen that for all values of micro current at least between the range of 1–200 microamps the ratio remains relatively constant. Advantage is taken of this characteristic such that by knowing and controlling the DC gain the AC gain is forced to track almost exactly.

Accordingly, as shown in FIG. 1, assume that for a given AC signal Vin at input 12, and for a given light transfer function, the output AC signal, Vout, at terminal 16 will be a certain level.

The amount of DC light impinging on diode 1LDD2 is a function of the DC bias of the input circuit, iDET, controlled by +V and by resistor 1R1 as well as being a function of the light transfer characteristics between photodiodes 1LED1 and 1LDD2. Current flowing through diode 1LDD2 is expressed as g.iDET where g is the unknown transfer characteristic which must be compensated for. Since the bias DC voltage +V, as well as the bias resistor 1R1 is held constant, the only difference in DC bias current flowing through diode 1LDD2 results from a variation in the light transfer function. Accordingly, if the output circuit is arranged to maintain the DC output current at a certain level, the AC signal, since it tracks the DC level at the output will then also be controlled. Accordingly, the amplitude of Vin is exactly reflected in a corresponding change in the amplitude of Vout. The output Vo of multiplier 1M1, which is applied via resistor 1R2 to the minus input of amplifier 1A3. Amplifier 1A3 is an open loop comparator and is arranged in conjunction with multiplier 1M1 in a closed loop feedback circuit such that VO(DC) equals the DC reference voltage VREF(DC). Multiplier 1M1 can be constructed in any one of the well known configurations, such as RCA CA3091D. Amplifier 1A2 is a voltage follower. Of course, it is known that the multiplier can be substituted for by a divider with proper inversion. Also other circuits could be used for the comparing function.

The relationships of the DC voltages of FIG. 1 are shown in FIG. 2 where Vy is shown to equal the DC reference voltage divided by the product of the output side DC voltage Vx and the multiplication factor M of multiplier 1M1.

Now, examining the AC voltage output of multiplier 1M1 we can see that such a voltage may be expressed as the AC component Vx(AC) of the signal crossing the barrier multiplied by voltage Vy from the output of voltage comparator 1A3 multiplied by the multiplication factor M of multiplier 1M1. When the equations are worked through as shown in FIG. 3 we arrive at the conclusion that the AC component of Vo equals the AC input signal Vin times a constant K times the DC reference voltage VREF(DC). The constant K is shown as a function of the fixed bias voltage and fixed resistors all of which are in the input circuit. Thus, by controlling the DC value of reference voltage −VREF the output magnitude of the AC input signal is precisely controllable.

Note that for a gain of the AC input voltage the DC reference voltage can be increased and, conversely, for an attenuation of the AC input signal the DC reference voltage may be reduced.

It is important to also note that the AC output signal is not dependent upon the DC value of the voltage VX(DC) and thus the gain variation caused by the unknown factor g has been removed from the output signal. Accordingly, by setting the reference voltage at a given level the AC output voltage level becomes a function only of the constant K, independent of the characteristics of the optocoupler device.

When it is desired to remotely control the AC gain of a circuit, such as, for example, by an attendant on a long distance trunk circuit, provision can be made to remotely change the value of the reference DC voltage which change can be accomplished by a variable resistor, such as resistor 1RV (FIG. 1), or by any other well known circuits adapted for DC voltage control. In the most basic situation VREF(DC) may be established by a fixed voltage and a resistive divider circuit as shown.

Figure 6:
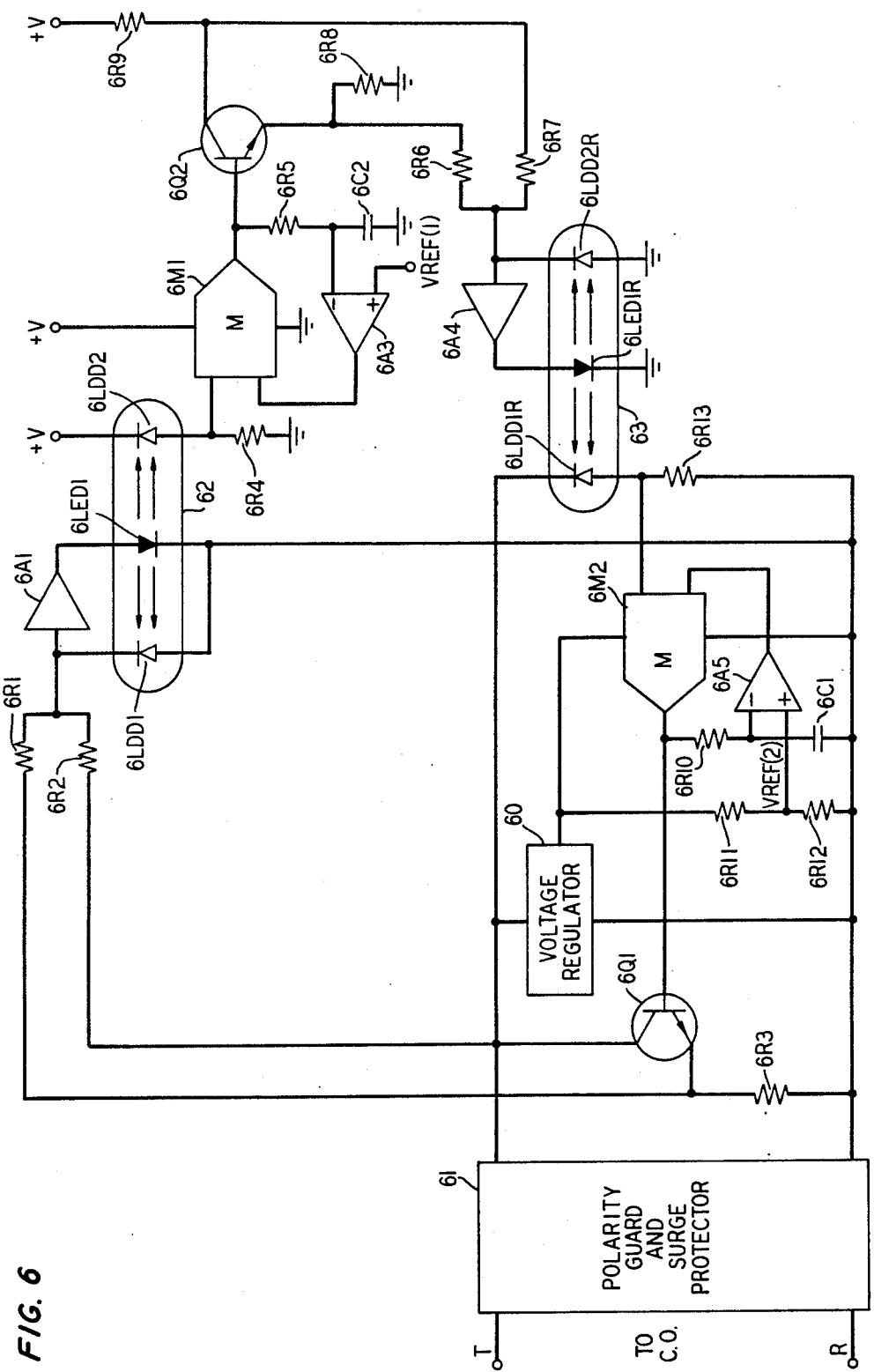
FIG. 6 shows a 2-way optocoupled hybrid.

FIG. 6 shows a bidirectional optocoupled hybrid used for telephone communication lines. An input signal from a central office, or other source, (not shown) would be provided via polarity guard and surge protector 61 to the input of the circuit. The forward direction, as defined from the central office to the bus resistor 6R9, would have this input signal pass, via resistors 6R1 and 6R2 to amplifier 6A1 to photodiode 6LED1 and across the barrier to photodetector 6LDD2. This signal would then be passed through multiplier 6M1, corrected as for gain in the manner discussed for FIG. 1 and then passed, via transistor 6Q2 to the output bus resistor 6R9. The circuit shown in FIG. 6 operates in the manner shown in U.S. Pat. No. 4,045,615 issued to D. B. James, C. K. Liu and D. C. Smith on Aug. 30, 1977 to provide hybrid signal cancellation in conjunction with the mono-bus technique discussed in U.S. Pat. No. 3,991,279 issued to D. J. Morgan and D. C. Smith on Nov. 9, 1976.

Signals on the bus from another source which could be a circuit similar to FIG. 4 would pass via resistors 6R6 and 6R7 and amplifier 6A4 and photodiode 6LED1R to photodetector 6LDD1R. This signal would then be passed through multiplier 6M2, corrected for signal gain in the manner discussed for FIG. 1, and then passed, via transistor 6Q1 and the polarity guard, to the central office line.

Thus, as shown in FIG. 6, there is provided a bidirectional device for controlling the gain of a transmission circuit using a DC reference voltage for each direction of transmission. Thus, by using our optocoupled device it is possible to control the transmission levels of each direction by controlling the DC reference voltage, which can be done locally or remotely. It should be borne in mind that each direction of transmission may be controlled independent of the other and can either be fixed for a given circuit or variable, depending upon the environment.

CONCLUSION

Only a few of the possible uses of our device have been discussed herein. There is no doubt that one skilled in the art will be able to utilize our invention advantageously in a variety of circuit configurations without departing from the spirit or scope of our invention. In a copending concurrently filed application, Ser. No. 893,794, filed in our names, we have disclosed an improvement of this invention where the DC voltage crossing the optobarrier is a function of the input DC voltage. Such a circuit is useful for correcting output signals for transmission line losses. This copending application is hereby incorporated by reference.

What is claimed is:

1. A remote gain controlled optocoupled transmission circuit having an input terminal and an output terminal, said terminals separated by a photocoupled barrier, the input side of said barrier containing phototransmitting means operable for providing modulated phototransmission across said barrier in accordance with input transmission signals, and the output side of said barrier containing photodetecting means operable under control of received modulated phototransmission for providing an output transmission signal linearly representative of said input transmission signal, means for remotely establishing a reference DC voltage level, and means for controlling the gain of said output transmission signal in accordance with the relative levels between any said established reference DC voltage and a DC voltage derived from said photodetecting means as a result of received phototransmission.

2. The invention set forth in claim 1 wherein said controlling means includes a multiplier circuit and an open loop comparator circuit arranged to form a closed loop DC voltage feedback circuit.

3. The invention set forth in claim 2 wherein said open loop comparator has an output connected to a first input of said multiplier, and wherein a second input of said multiplier is adapted to receive said derived DC voltage.

4. The invention set forth in claim 3 wherein the output of said multiplier is connected to a first input of said open loop comparator, and wherein said reference DC voltage is connected to a second input of said open loop comparator.

5. A remote gain controlled transmission interface circuit for use in a switching system where any number of telephone communication lines can be connected together for transmission purposes, one said interface circuit being interposed between each telephone line and a common bus, said common bus including a summing means shared in common by any interface circuit connected to said common bus, each said interface circuit including, first output current signals means for converting input voltage signal from said associated telephone line into output current signals and for communicating said converted output current signals to said common summing signals thereby being convertible into bus voltage signals by said common bus summing means, means for applying any converted bus voltage signals to said telephone line associated therewith, means for subtracting from said applied converted bus voltage signals any portion of said converted voltage signals which are representative of input voltage signals received over said associated telephone line, said input voltage converting means including:

a first amplifier circuit means having an output and an input;

a first light-emitting means coupled to the output of the first amplifier circuit means;

first and second light detector means, the first and second light detector means being positioned so as to receive light from the first light-emitting means;

the first and second light detector means being characterized in that incident light thereon is proportional to the current induced therethrough; and the ratio of the induced currents is essentially constant;

the first light detector means being coupled to the input of the first amplifier;

first multiplier circuit means having an output and an input;

the second light detector means being coupled to the input of the said multiplier circuit means;

the output of said multiplier connectable to said common bus and to said subtracting means;

said telephone line applying means including;

second amplifier circuit means having an input and an output;

a second light-emitting means coupled to the output of the second amplifier circuit means;

third and fourth light detector means, the third and fourth light detector means being positioned so as to receive light from the second light-emitting means;

the third and fourth light detector means being characterized in that incident light thereon is proportional to the current induced therethrough and the ratio of the induced currents is essentially constant;

the third light detector means being coupled to the input of the second amplifier circuit means;

second multiplier circuit means having an output and an input;

said fourth light detecting means is coupled to the input of said second multiplier circuit means, and the output of said second multiplier circuit means connectable to said telephone line;

means for remotely establishing a first reference DC voltage;

first means for controlling the gain of AC voltage levels generated by said second light detector means in accordance with the relative levels between said first reference voltage and a DC voltage derived from said second light detecting means as a result of received phototransmission;

means for remotely establishing a second reference DC voltage; and second means for controlling the gain of AC voltage levels generated by said fourth light detector means in accordance with the relative levels between said second reference DC voltage and a DC voltage derived from said fourth light detecting means as a result of received phototransmission.

* * * * *